US006484671B2

(12) United States Patent
Herrenbruck (10) Patent No.: US 6,484,671 B2
(45) Date of Patent: Nov. 26, 2002

(54) TREAT DISPENSING TOY

(75) Inventor: Rod K. Herrenbruck, Chesterfield, MO (US)

(73) Assignee: Marketing and Creative Sales, Chesterfield, MO (US)

( * ) Notice: Subject to any disclaimer, the term of this patent is extended or adjusted under 35 U.S.C. 154(b) by 99 days.

(21) Appl. No.: 09/776,451

(22) Filed: Feb. 2, 2001

(65) Prior Publication Data

US 2002/0106968 A1 Aug. 8, 2002

(51) Int. Cl.[7] ............................................. A01K 29/00
(52) U.S. Cl. ...................... 119/707; 119/710; 119/711
(58) Field of Search ............................... 119/707, 709, 119/702, 710, 711; D30/160; 446/409, 397; 273/153 R (56) References Cited

U.S. PATENT DOCUMENTS

| | | | | |
|---|---|---|---|---|
| 666,022 A | * | 1/1901 | Norris et al. | 273/153 R |
| 2,529,661 A | * | 11/1950 | Millstein | 426/104 |
| 2,590,476 A | * | 3/1952 | Stough | 215/228 |
| 3,648,403 A | * | 3/1972 | Gommel | 119/707 |
| 4,595,369 A | * | 6/1986 | Downs | 273/109 |
| 5,343,828 A | * | 9/1994 | Houghton et al. | 119/51.03 |
| 5,375,839 A | * | 12/1994 | Pagani | 446/409 |
| 5,387,108 A | * | 2/1995 | Crowell | 40/124.03 |
| 5,575,240 A | * | 11/1996 | Udelle et al. | 119/707 |
| 5,634,436 A | * | 6/1997 | Coombs et al. | 119/707 |
| 5,758,604 A | * | 6/1998 | Jorgensen | 119/711 |
| 5,794,568 A | * | 8/1998 | Udelle et al. | 119/707 |
| 5,813,366 A | * | 9/1998 | Mauldin, Jr. | 119/707 |
| 5,819,690 A | * | 10/1998 | Brown | 119/707 |
| 5,832,877 A | * | 11/1998 | Markham | 119/710 |
| 5,865,147 A | * | 2/1999 | Rubin | 119/711 |
| 5,947,061 A | * | 9/1999 | Markham et al. | 119/710 |
| 5,957,082 A | * | 9/1999 | Budman et al. | 119/54 |
| 5,965,182 A | * | 10/1999 | Lindgren | 119/707 |
| 6,039,213 A | * | 3/2000 | Sloan et al. | 222/192 |
| 6,073,581 A | * | 6/2000 | Wang | 119/51.01 |
| 6,098,571 A | * | 8/2000 | Alexrod et al. | 119/707 |
| 6,158,390 A | | 12/2000 | Holtier et al. | |
| 6,237,538 B1 | | 5/2001 | Tsengas | |
| 6,289,846 B1 | * | 9/2001 | Long | 119/51.03 |
| 6,325,693 B1 | * | 12/2001 | Rudell et al. | 426/104 |
| 2001/0008125 A1 | * | 7/2001 | Mann | 119/709 |
| 2001/0027754 A1 | | 10/2001 | Tsengas | |

OTHER PUBLICATIONS

R.C. Steele Online Pet Supplies, Internet online pet supply advertisement for "Wiggly Giggly" pet toy, available on–line at www.rcsteele.com/ on Nov. 18, 2000.

Information Storage Devices, Inc., Data Sheet—ISD 1510, Single–Chip, Single–Message Voice Record/Playback Device 8– to 16– Second Durations, 20 pages, Copyright 1997.

Product tag—Play–N–Speak™ Toy; Copyright Notice 2000.

* cited by examiner

*Primary Examiner*—Yvonne R. Abbott
(74) *Attorney, Agent, or Firm*—Senniger, Powers, Leavitt & Roedel (57) ABSTRACT

A toy having a treat dispensing and sound recording and playback capability. The toy preferably comprises a ball that has an opening and an exit. A sound unit having recording and playback capability is removably secured to the opening. Treats are loaded into the interior space of the ball through the opening by removing the sound unit. A ring closure member is secured to the exit and restricts the size of the exit. A plurality of barriers are disposed about the interior of the ball. The barriers are preferably affixed to the inner surface of the ball. When the sound unit and ring closure are installed, treats are released from the ball, via the exit, by navigating past the barriers. Sounds can be recorded on the sound unit. The recorded sounds are selectively played back when the ball is manipulated by the user.

25 Claims, 9 Drawing Sheets

TREAT DISPENSING TOY

BACKGROUND OF THE INVENTION

The invention relates generally to a toy. In particular, the invention relates to a toy for a pet or child that can record and playback sounds, and dispense treats or other desirable objects when manipulated.

There are a number of amusement devices and toys in the prior art for entertaining and stimulating their users, often pets or children. Some toys are designed to stimulate the user, be that user a pet or a child, by emitting sounds. For example, U.S. Pat. No. 5,375,839 discloses an impact sensitive talking ball that emits a message when the ball is hit or bounced. Other toys are designed to dispense desired objects, such as pet treats. U.S. Pat. No. 6,098,571 provides an example of such a device. The device disclosed in that patent provides an inner housing that is movable within an outer housing. As the device is motioned by a pet, the device delivers treats placed in the inner housing through openings associated with the outer housing.

These devices in the prior art, however, provide only limited stimulation. A device might provide an audio-based stimulation that is designed to engage a user's attention. Another device may attract a user's attention by delivering treats when the device is used. Such limited stimulation reduces the likelihood that a user, such as a pet, will be sufficiently interested in the toy to use it as intended.

For these reasons, an improved treat dispensing toy is desired. Such an improved treat dispensing toy benefits from providing multiple sensory stimuli. For example such a toy provides a visually attractive toy that is of an appropriate size and shape to engage the target user's attention. The toy also provides the capability to selectively deliver desired objects, such as treats, when the toy is manipulated by the user. Likewise, the toy provides audio stimulation to keep the target user's attention once engaged. Such stimulation is preferably user definable.

SUMMARY OF THE INVENTION

The invention meets the above needs and overcomes the deficiencies of the prior art by providing an improved treat dispensing toy. This is accomplished by providing a toy that attracts the intended user's attention by providing multiple levels of stimulation. Such stimulation preferably includes audio stimulation and reward stimulation. By allowing recording of messages and sounds that can be selectively played back as the toy is used, the intended user's attention is engaged. Further, by allowing treats to be dispensed as the toy is manipulated, the user is rewarded for using the toy.

Briefly described, a toy embodying aspects of the invention includes a housing having an interior space, an inner surface, and an exterior surface. A first portion of the interior space defines a treat cavity into which one or more treats are loaded. An opening in the housing is adjacent the treat cavity. One or more treats are loaded into the treat cavity through the opening. The toy also includes a plurality of barriers, at least one of which is positioned in a second portion of the interior space. The one or more treats are dispensed from the second portion of the interior space when the toy is manipulated by a user. An exit from the housing is positioned adjacent the second portion of the interior space. The one or more treats are dispensed through the exit. A sound unit selectively plays a pre-recorded sound. The sound unit is removably secured to the opening such that it substantially closes the opening when secured therein. When the sound unit is secured to the housing, the one or more treats can exit the toy only through the exit by navigating past the plurality of barriers.

Another toy embodying aspects of the invention includes a housing having an interior space, an inner surface, and an exterior surface. A first portion of the interior space defines a treat cavity into which one or more treats are loaded. An opening on the housing is adjacent the treat cavity. The one or more treats are loaded through the opening. An exit from the housing is adjacent a second portion of the interior space. The one or more treats are dispensed through the exit. Barrier means retard the movement of the one or more treats when the housing is manipulated by a user. The barrier means are positioned in a second portion of the interior space between the treat cavity and the exit. A sound producing means selectively plays a pre-recorded sound. The sound producing means is removably secured to the opening and substantially closes the opening when secured therein. When the sound producing means is secured to the housing, the one or more treats can exit the toy only through the exit by navigating past the barrier means.

Still another toy embodying aspects of the invention includes a substantially spherical housing having an axis, an inner surface, an interior space, and an exterior surface. A treat cavity is disposed within the interior space. One or more treats are loaded into the treat cavity. An opening in the housing is adjacent the treat cavity. One or more treats are loaded into the treat cavity through the opening. An exit from the housing is positioned about the axis. The exit permits the one or more treats to exit the housing when the housing is manipulated by a user. A plurality of barriers is positioned between the treat cavity and the exit. The plurality of barriers restricts movement of the one or more treats along the inner surface between the treat cavity and the exit when the housing is manipulated by the user. A sound unit is removably secured to the opening. The sound unit has a recording capability and a playback capability. The sound unit also has a switch that selectively activates the playback capability when the housing is manipulated by the user.

Alternatively, the invention may comprise various other methods and systems.

Other objects and features will be in part apparent and in part pointed out hereinafter.

DETAILED DESCRIPTION OF PREFERRED EMBODIMENTS

Figure 1:
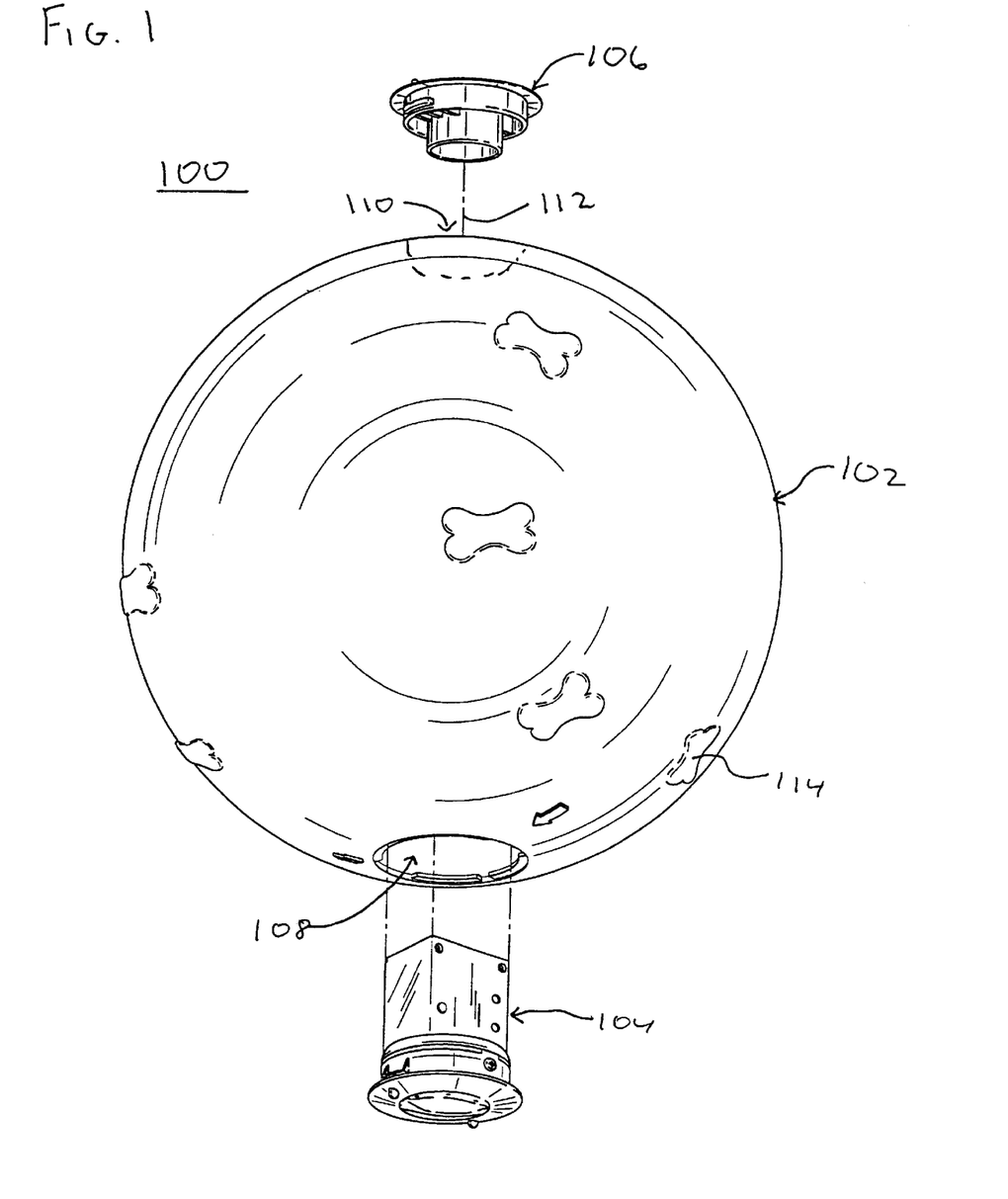
FIG. 1 is an exploded side view of a talking treat ball illustrative of aspects of the present invention.

Referring now to the drawings, FIG. 1 is an exploded side view of a talking treat dispensing toy, according to aspects of the present invention, that is suitable for use in dispensing desired objects, such as pet treats, when manipulated by a user, such as a pet. As shown in FIG. 1, the toy preferably (although not necessarily) comprises a ball 100 having a generally spherical shape. The ball 100 is preferably made out of a hard substance such as plastic that can be manufactured using readily available fabrication processes.

As can be appreciated from FIG. 1, ball 100 includes a housing 102 (also referred to as a shell), a sound unit 104, and a ring closure member 106. Preferably, the sound unit 104 is removably secured to an opening 108. Similarly, the ring closure member 106 is removably secured to an exit 110. In the embodiment illustrated in FIG. 1, the opening 108 and the exit 110 are positioned substantially about a central axis 112 of the housing 102. As shown in FIG. 1, both sound unit 104 and ring closure 106 are secured to opening 108 and exit 110 respectively by bayonets or similar means. Additional aspects of sound unit 104 and ring closure 106 are discussed in greater detail below.

A plurality of raised features or embossments, such as bone shaped symbols 114, are preferably positioned on the exterior of housing 102. Aside from providing an aesthetic quality, these raised symbols 114 facilitate gripping of ball 100 by a user and may be referred to as grip members. For example, a dog can grip ball 100 in its mouth by way of raised symbols 114. The raised symbols 114 are preferably formed integrally with housing 102.

Figure 2:
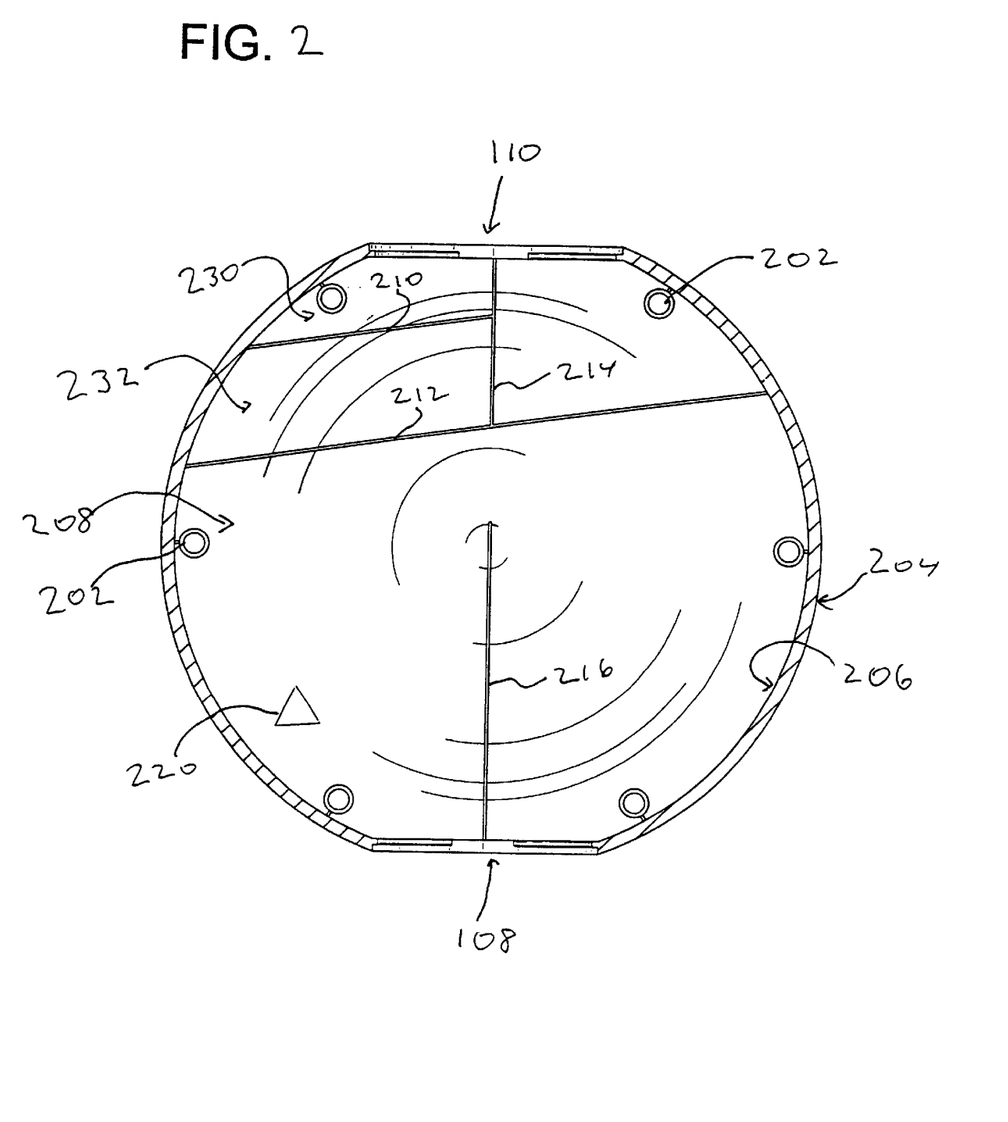
FIG. 2 is a cross sectional view of a first half sphere, including barrier members, suitable for use as part of the talking treat ball of FIG. 1.
Figure 3:
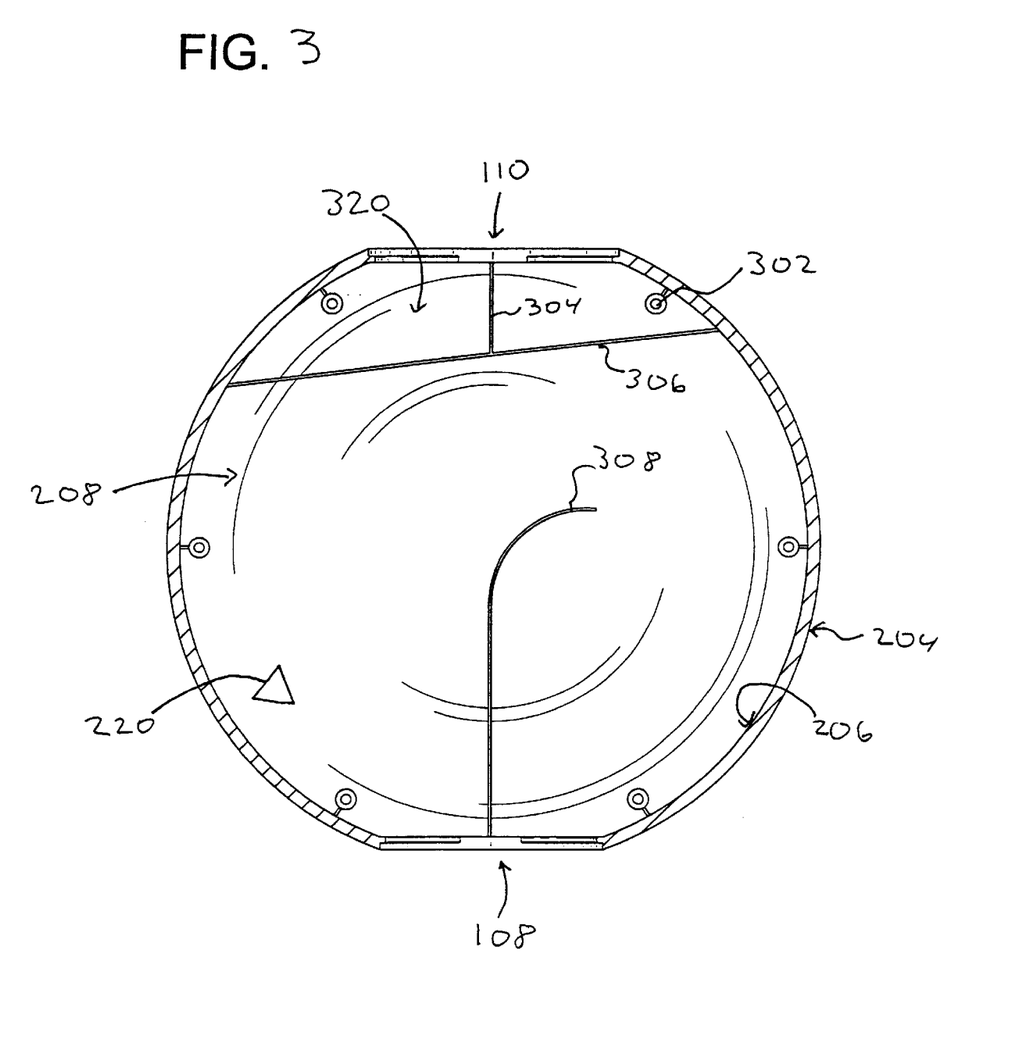
FIG. 3 is a cross sectional view of a second half sphere, including barrier members, suitable for use as part of the talking treat ball of FIG. 1.

FIGS. 2 and 3 are cross-sectional views of two half spheres 200 and 300 that may be mated together along a substantially circular edge of each to form housing 102. The first half sphere 200 includes a plurality of sockets 202 positioned about its circumference for mating with a plurality of corresponding pins 302 positioned about the circumference of the second half sphere 300. When mated together, the exterior of half spheres 200 and 300 form the exterior surface 204 and inner surface 206 of housing 102, and define an interior space 208. The lower portion of the interior space 208, as shown in FIGS. 2 and 3, is generally referred to as a treat cavity. One or more treats 220, such as a pet treat, may be loaded into the treat cavity of interior space 208. In particular, the treat 220 is loaded into the treat cavity of interior space 208 by removing sound unit 104 (FIG. 1). It should also be noted that FIGS. 2 and 3 are shown with sound unit 104 and ring closure member 106 removed.

A first plurality of barrier members 210, 212, 214, 216 is preferably positioned adjacent the inner surface 206 of half sphere 200. Similarly, a second plurality of barrier members 304, 306, 308 is positioned adjacent the inner surface 206 of half sphere 300. Although a detailed explanation of the functionality of the barrier members is provided below, it should now be appreciated that the various barrier members cooperate to retard the movement of treat 220 as ball 100 is manipulated by a user. By retarding the movement of treat 220, ball 100 regulates treat dispensing.

Figure 4A:
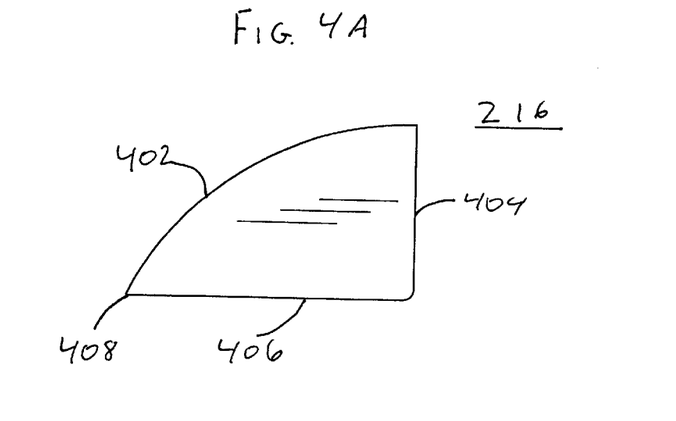
FIGS. 4A–4G are top views of the barrier members of FIGS. 2 and 3.

FIGS. 4A–4G illustrate detailed aspects of the barrier members, also referred to as fin members. FIG. 4A is a plane view of barrier member 216. Barrier member 216 has a generally arcuate edge 402 that is affixed to inner surface 206 of half sphere 200, and two substantially straight edges 404, 406 that are not so affixed. The arcuate edge 402 is positioned along the inner surface 206 such that a tip 408 substantially abuts the opening 108, as shown in FIG. 2.

Figures 4B, 4C, 4D:
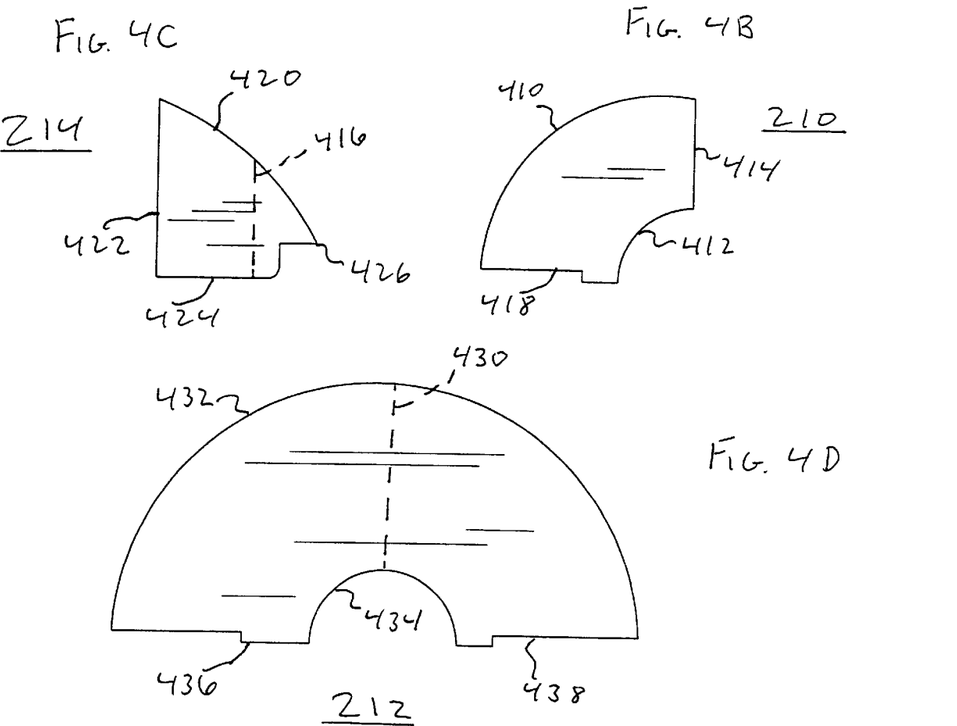

FIG. 4B is a plane view of barrier member 210. The view depicted in FIG. 4B is looking down upon barrier 210 from exit 110. Barrier member 210 has a first generally arcuate edge 410 that is affixed to inner surface 206 of half sphere 200 along a contour having substantially the same shape as the edge 410. A second generally arcuate edge 412 of barrier member 210 is not affixed and forms part of a semi-circular hole, the center of which is preferably substantially centered about the central axis 112 (FIG. 1). A substantially straight edge 414 is affixed to barrier member 214 at a position identified in FIG. 4C by a line 416 (shown in phantom). Thus, the length of edge 414 is substantially the same as the length of the line 416. Barrier member 210 also has a tabbed edge 418 that is exposed to interior space 208.

FIG. 4C is a plane view of barrier member 214. As illustrated therein, barrier member 214 has a generally arcuate edge 420 adjacent a substantially straight edge 422. Barrier member 214 also has a notched edge 424. The arcuate edge 420 of barrier member 214 is affixed to inner surface 206 of half sphere 200 such that a tip 426 abuts exit 110, and such that the edge 422 substantially bisects barrier member 212 at a position identified in FIG. 4D by a line 430 (shown in phantom). Thus, the length of edge 422 is substantially the same as the length of the line 430. The notched edge 424 is exposed to interior space 208.

FIG. 4D is a plane view of barrier member 212. The view depicted in FIG. 4D is looking down upon barrier 212, as viewed from exit 110. Barrier member 212 has a first generally arcuate edge 432 that is affixed to inner surface 206 of half sphere 200 along a contour having substantially the same shape as the edge 432. A second generally arcuate edge 434 of barrier member 212 is not affixed and forms part of a semi-circular hole, the center of which is preferably substantially centered about central axis 112. First and second tabbed edges 436, 438 are exposed to interior space 208.

Figure 4E:
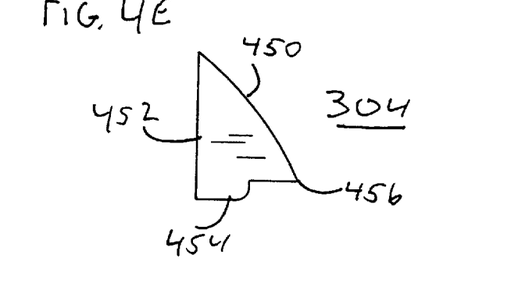

FIG. 4E is a plane view of barrier member 304. As shown therein, barrier member 304 has a generally arcuate edge 450, a substantially straight edge 452, and a notched edge 454. The arcuate edge 450 of barrier member 304 is affixed to inner surface 206 of half sphere 300 along a contour having substantially the same shape as the edge 450. A tip 456 of barrier member 304 abuts exit 110 at a position substantially opposite of the tip 426 of barrier member 214 (FIG. 4C). The straight edge 452 substantially bisects barrier member 306 at a position identified in FIG. 4G by line 458 (shown in phantom). The length of edge 452 is substantially the same as the length of the line 458. The notched edge 454 of barrier member 304 is exposed to interior space 208.

Figure 4F:
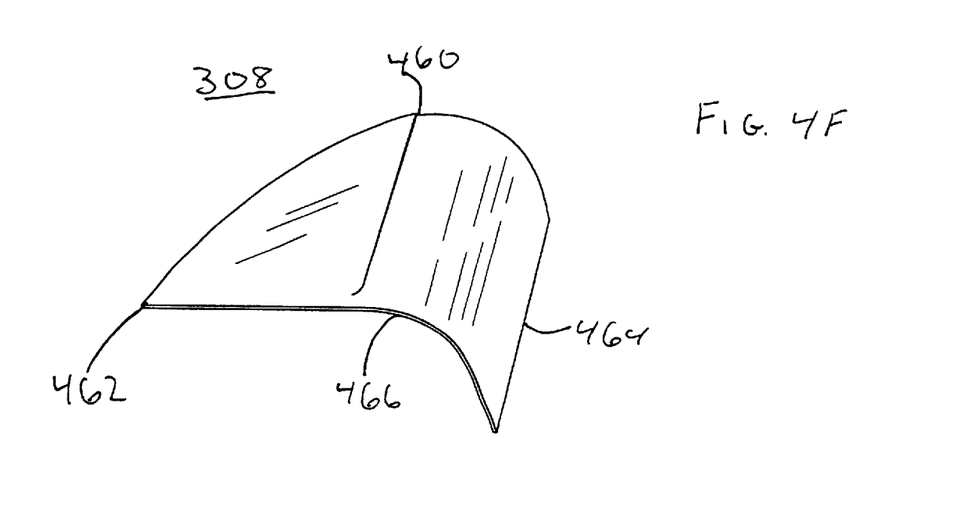

FIG. 4F is a perspective view of barrier member 308. Barrier member 308 has a generally J-shaped curved edge 460 that is affixed to inner surface 206 of half sphere 300 along a contour having substantially the same shape as the edge 460. A tip 462 of barrier member 308 abuts opening 108 at a position substantially opposite of the tip 408 of barrier member 216 (FIG. 4A). Barrier member 308 also has a straight edge 464 and a curved edge 466 that are exposed to interior space 208.

Figure 4G:
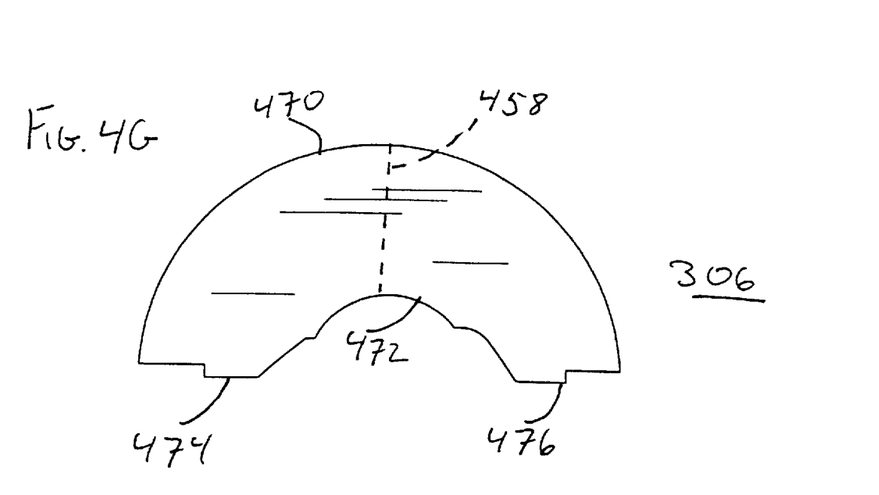

FIG. 4G is a plane view of barrier member 306. The view depicted in FIG. 4G is looking down upon barrier 306 from exit 110. Barrier member 306 has a generally arcuate edge 470, a notched arcuate edge 472, a first tabbed edge 474, and a second tabbed edge 476. The arcuate edge 470 is affixed to inner surface 206 of half sphere 300 along a contour having substantially the same shape as edge 470. The notched arcuate edge 472 and the first and second tabbed edges 474, 476 are exposed to interior space 208.

Figures 5, 6:
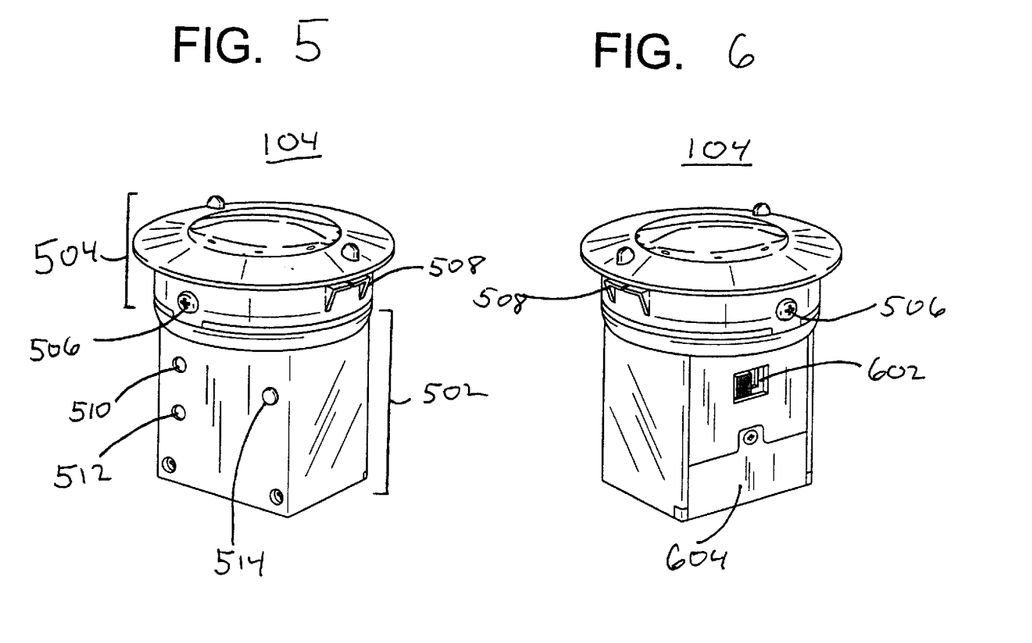
FIGS. 5 and 6 are perspective views of a sound unit suitable for use with the talking treat ball of FIG. 1.
Figure 7:
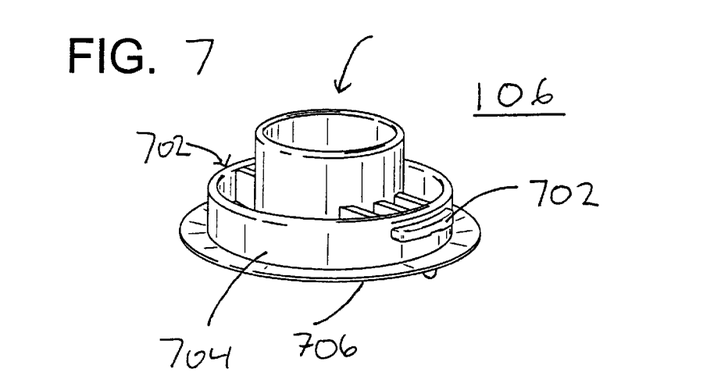
FIG. 7 is a perspective view of a ring closure member suitable for use with the talking treat ball of FIG. 1.

FIGS. 5 and 6 are perspective views of sound unit 104. As illustrated therein, sound unit 104 includes a main body 502 and an end cap 504 that is removably affixed to main body 502 by fasteners such as screws 506. The end cap 504 includes a pair of bayonet tabs 508 for securing sound unit 104 to opening 108 by means that are known in the art. End cap 504 also covers a speaker (not shown in FIGS. 5 and 6). FIG. 5 illustrates that sound unit 104 preferably includes a microphone 510, an LED 512, and a record switch 514. FIG. 6 illustrates an on/off switch 602, and a battery cover 604. The operation of these aspects sound unit 104 of will be explained in greater detail below with respect to FIG. 8. FIG. 7 is a perspective view of ring closure member 106. As can be appreciated from FIG. 7, ring closure member 106 preferably includes a pair of bayonet tabs 702, a disc member 704, and a flange 706. The bayonet tabs 702 are positioned on opposite sides of the disk member 704. Bayonet tabs 702 secure ring closure 106 to exit 110 by means that are understood in the art. Preferably, when ring closure 106 is properly secured to exit 110, the flange member 706 is substantially flush with the outer surface 204 of shell 102.

Figure 8:
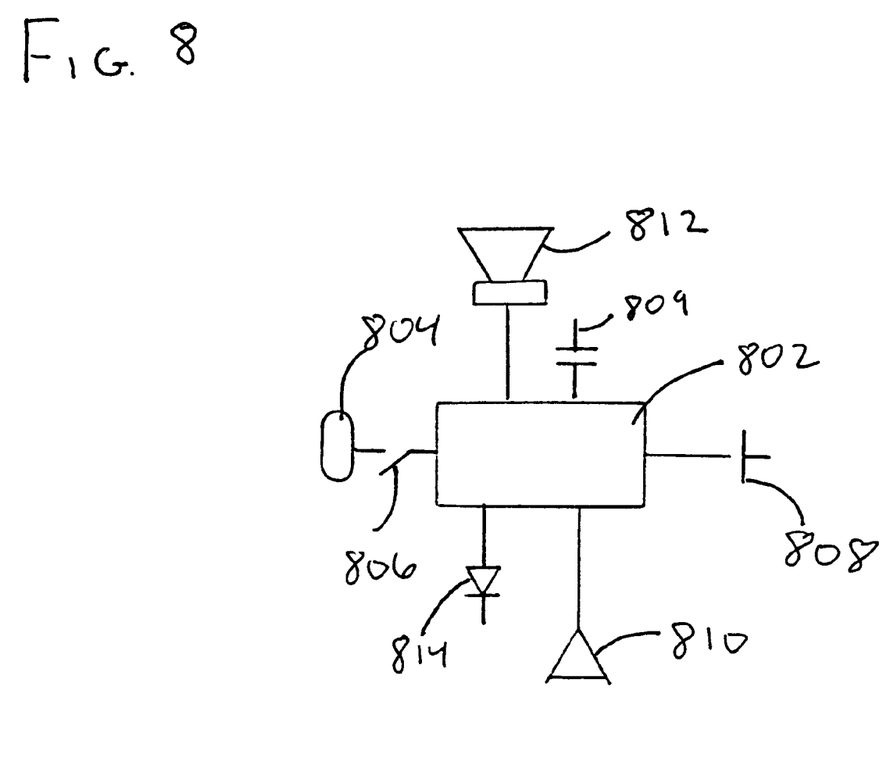
FIG. 8 is a block diagram of the electronics associated with the sound unit depicted in FIGS. 5A and 5B

FIG. 8 is a schematic of a circuit suitable for implementing an electronics package associated with sound unit 104. The electronics package includes a miniature processing device (e.g., processor 802). The type of processing device used is not critical, however it is preferred that the device be capable of storing one second or more of recorded sound data in a non-volatile memory. Processor 802 is preferably powered by one or more batteries 804, such as miniature 1.5 volt watch or calculator batteries. A power switch 806 (see also on/off switch 602 in FIG. 6) allows processor 802 to become operational. Also connected as an input to processor 802 is a record switch 808. Preferably, the record switch 808 comprises a momentary contact switch that is normally in the open position. A microphone 810 (see also reference character 510 in FIG. 5) is also connected as an input to processor 802. A motion-activated playback initiation switch 809 is another input to processor 802. A speaker 812 is connected as an output to processor 802, as is an LED 810 (see also reference character 512 in FIG. 5).

Figure 9:
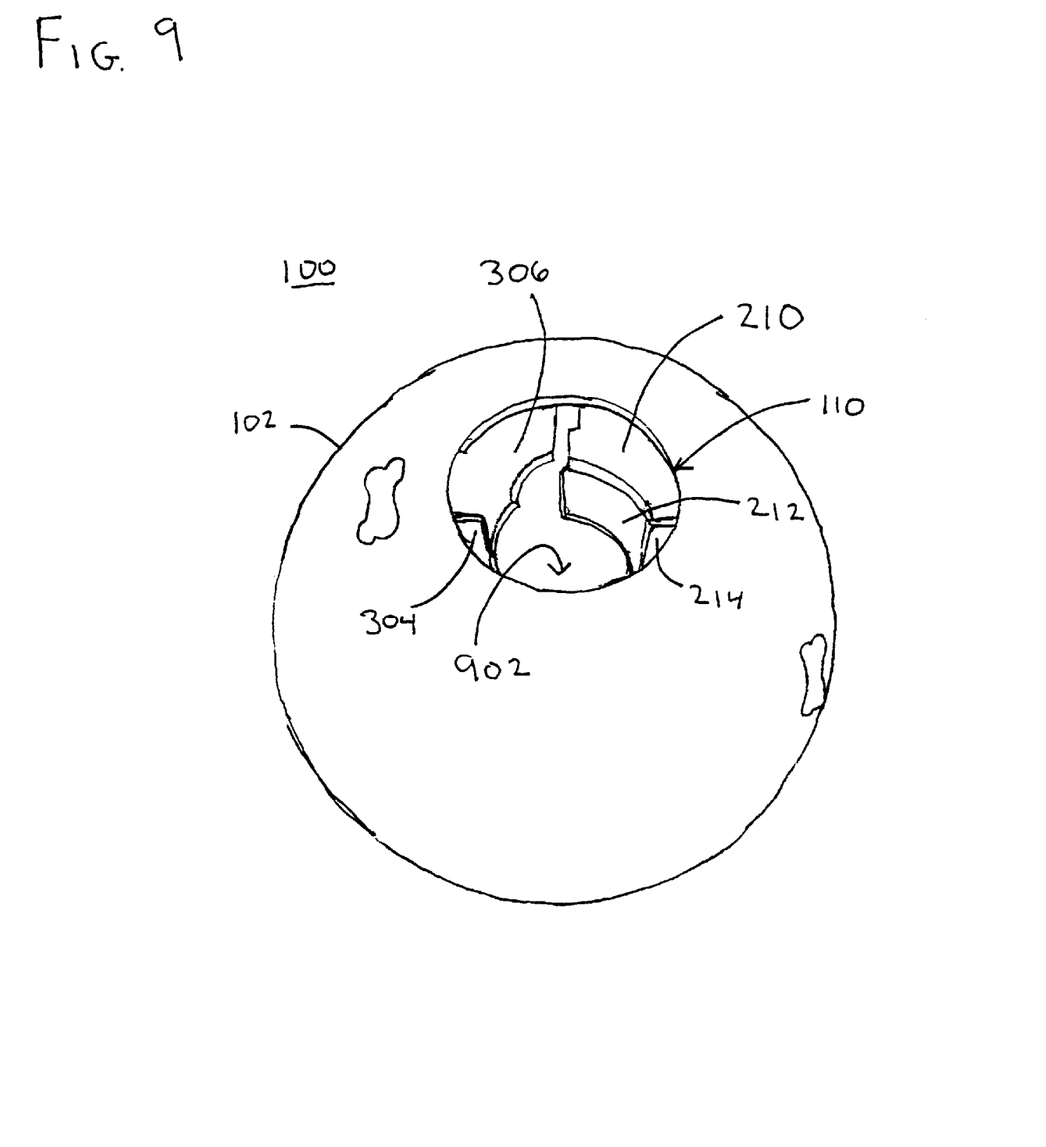
FIG. 9 is a perspective view of the talking treat ball of FIG. 1, providing a perspective view of several of the barrier members illustrated in FIGS. 2, 3, and 4A–G.

FIG. 9 is a perspective view of ball 100 of FIG. 1 that illustrates how barriers 210, 212, 214, 304, and 306 cooperate to retard and otherwise affect the movement of treat 220 when ball 100 is manipulated by a user such as a dog or other pet attempting to cause treat 220 exit ball 100. For clarity, FIG. 9 is drawn with ring closure 106 removed. One of the reasons for making ring closure 106 removable is to facilitate cleaning of the interior of ball 100. It is to be understood, however, that ring closure member is preferably secured to exit 110 during normal use.

As shown in FIG. 9, barriers 210, 212, and 306 operate to form a staircase or ladderlike arrangement between a first portion of shell 102 and another portion of shell 102. Arcuate edge 412 of barrier 210, arcuate edge 434 of barrier 212, and arcuate edge 472 of barrier 306 form a bore 902 between exit 110 and the first portion of shell 102.

Figure 10:
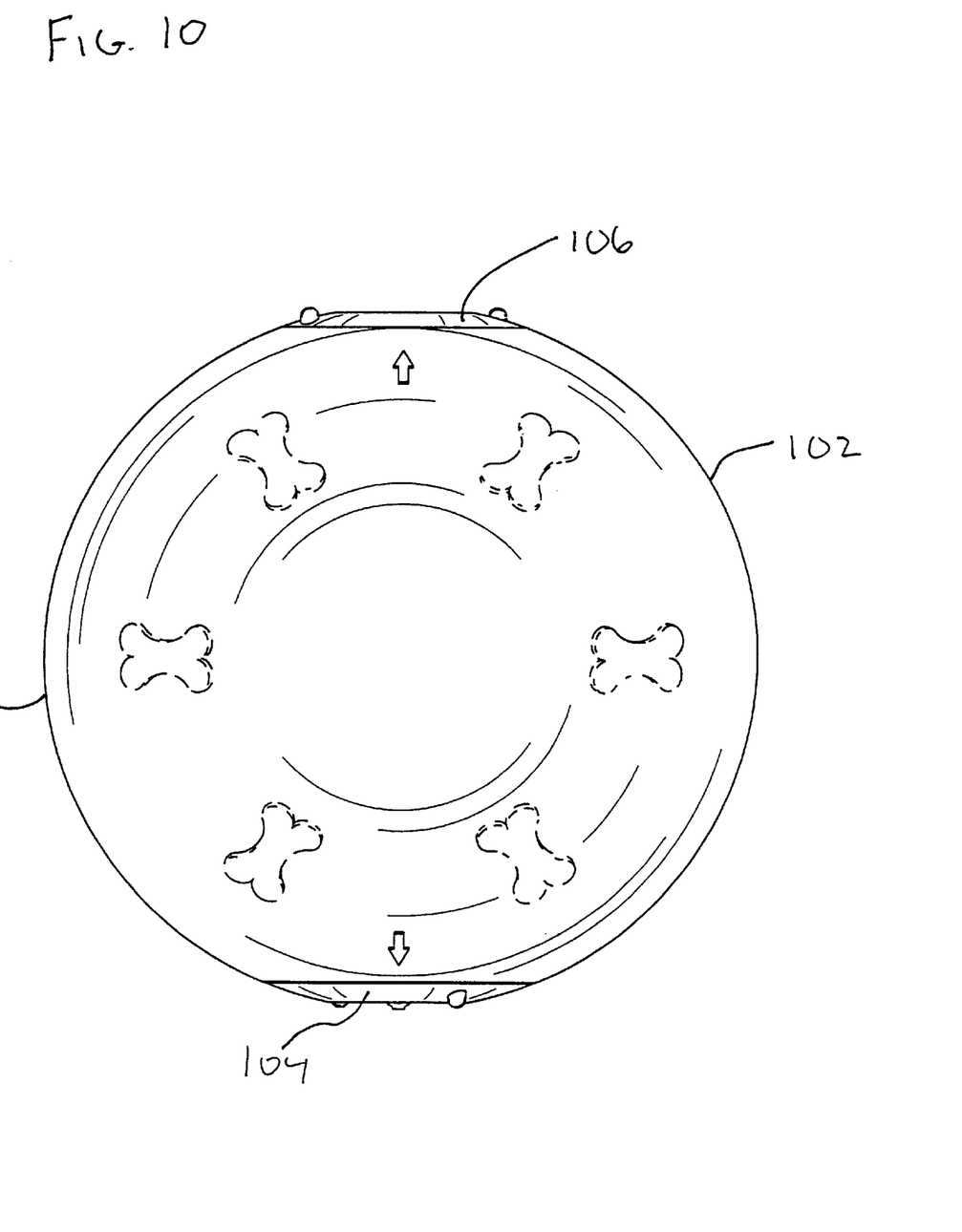
FIG. 10 is a side view of the talking treat ball of FIG. 1 with the sound unit and ring closure installed.

FIG. 10 is a side view of ball 100 of FIG. 1 with sound unit 104 and ring closure 106 secured to housing 102.

The operation of ball 100 will now be described. Referring first to FIGS. 1, 5, 6, and 8, when sound unit 104 is removed from housing 102, messages may be recorded by and stored in processor 802. For example, when power switch 806 is in the on position, power is supplied to processor 802. If a person thereafter depresses record switch 808 and utters a message into microphone 810, the message is recorded and stored processor 802. It should be understood that the term message is not to be construed to literally limit that which may be recorded to simple spoken messages. Rather, any recordable sound may be recorded and stored. The user may, for example, want to record a particular message know to stimulate his or her pet (e.g., "hey boy!!"). This feature advantageously allows the toy to entertain the user with a familiar voice or sound when the user and the person who made the recording are separated. When a message is being recorded, LED 814 preferably illuminates to indicate the status of the unit. It is also to be understood that multiple messages may be recorded that may be played back in a random and/or predefined order.

When power is supplied to processor 802, playback of the recorded message is initiated by action of the motion-activated playback initiation switch 809 ("playback switch"). Depending upon the intended user of toy 100, the type of playback switch 809 may be varied without detracting from the present invention. For example, playback switch 809 may be activated to cause processor 802 to play the recorded message by a simple motion such as rolling toy 100. Playback switch 809 could also be selected to cause message playback activation by a complex motion such as an impact upon the ball exceeding a preset value (e.g., dropping it from a distance). Simpler playback activation is also compatible with the present invention such as having the message played at specific or random time intervals whenever power is supplied to processor 802. Playback of the message serves several useful purposes, including stimulating a user to engage and manipulate ball 100.

Referring again to FIGS. 2 and 3, when sound unit 104 is removed, one or more treats 220 such as edible pet treats may be inserted into interior space 208 of housing 102 via opening 108. When sound unit 104 is thereafter secured to housing 102, opening 108 is closed, preventing treat 220 from exiting ball 100 by way of opening 108. When ball 100 is being used, ring closure 106 is preferably secured to exit 110 so that treat 220 can only exit ball 100 by passing through ring closure 106.

It should now be appreciated that the combination of sound unit 104 and the plurality of barriers 210, 212, 214, 216, 304, 306, 308 cooperate to retard the egress of treat 220 from ball 100 as ball 100 is manipulated by a user, such as a dog. For example, the interaction of barrier 304 and 306 of half shell 300 form a pair of traps 320, 321 that limit the possible course of travel of treat 220. Similarly, barriers 210, 212, and 214 cooperate to form additional traps 230, 232, 234 that also limit the possible course of travel of treat 220 as ball 100 is manipulated by a user. In the preferred embodiment depicted in the figures, the barrier members prevent also treat 220 from navigating directly along inner surface 206 toward exit 110 as ball 100 is rolled. By this action, treat release is regulated, and barrier members 210, 212, 214, 304, and 306 cooperate to form a staircase-like mechanism by which treat 220 cannot easily egress via exit 110. Likewise, barriers 216 and 308, along with sound unit 104, cooperate to tend to force treats to engage the other barriers (e.g., 212 and 306) as ball 100 is manipulated.

Although the preferred embodiments have been described primarily with respect to a toy for use in dispensing a pet treat when used by a pet, the toy of the present invention may to also be used as a children's toy for dispensing treats or other desired objects.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A toy comprising:
    a housing having an interior space, an inner surface, and an exterior surface, a first portion of said interior space defining a treat cavity into which one or more treats are loaded;
    an opening in the housing adjacent the treat cavity through which said one or more treats are loaded into the treat cavity;
    a plurality of barriers, at least one of said barriers being positioned in a second portion of said interior space, said one or more treats being dispensed from the second portion of said interior space when the toy is manipulated by a user;
    an exit from the housing adjacent the second portion of said interior space through which the one or more treats are dispensed; and
    a sound unit selectively playing a pre-recorded sound, said sound unit being removably secured to the opening and substantially closing the opening when secured therein, whereby when the sound unit is secured to the housing the one or more treats can exit the toy only through the exit by navigating past the plurality of barriers.

2. The toy of claim 1 wherein the plurality of barriers comprise a first fin member positioned on a first plane and a second fin member positioned on a second plane, and wherein said first and second fin members cooperate to retard the movement of the one or more treats as the housing is manipulated by the user.

3. The toy of claim 2 wherein the plurality of barriers further comprise a third fin member having a first edge and a second edge, said first edge being proximate to the inner surface of the housing and said second edge being adjacent the first fin member, wherein the third fin member substantially bisects the first fin member.

4. The toy of claim 3 further comprising a fourth fin member proximate the inner surface of the housing, said fourth fin member cooperating with the first, second, and third fin members to retard the movement of the one or more treats as the housing is manipulated by the user.

5. The toy of claim 1 wherein the plurality of barriers and the inner surface cooperate to form at least one trap between the treat cavity and the exit whereby the one or more treats cannot exit the housing when they are positioned in the at least one trap until the housing is further manipulated by the user.

6. The toy of claim 1 wherein the sound unit comprises a recording device selectively recording a desired message.

7. The toy of claim 6 wherein the sound unit further comprises a sound activation switch, said sound unit playing the desired message in response to an activation signal from said sound activation switch.

8. The toy of claim 7 wherein the sound activation switch comprises a motion activated switch.

9. The toy of claim 1 further comprising a ring closure member, removably attached to the exit, said ring closure having a central opening exposing the interior space of the housing, wherein when the ring closure is attached to the exit, the one or more treats may only exit through the ring closure, and wherein said ring closure may be removed to ease cleaning of the interior space of the housing.

10. The toy of claim 1 wherein the housing comprises a substantially spherical ball.

11. The toy of claim 10 wherein the substantially spherical ball comprises two half shells, each of said two half shells being of substantially the same size and each having a substantially circular edge, whereby the substantially spherical ball is formed by mating the two half shells together along their respective circular edges.

12. The toy of claim 11 wherein the substantially spherical ball comprises a hard plastic ball.

13. The toy of claim 12 further comprising a plurality of raised grip members positioned on the exterior surface of the housing.

14. The toy of claim 1 wherein the plurality of barriers are positioned to prevent a movement of the treat along the inner surface between the treat cavity and the exit when the housing is manipulated by the user.

15. The toy of claim 1 wherein the plurality of barriers are positioned to retard a movement of the treat along the inner surface between the treat cavity and the exit when the housing is manipulated by the user.

16. A toy comprising:
    a housing having an interior space, an inner surface, and an exterior surface, a first portion of said interior space defining a treat cavity into which one or more treats are loaded;
    an opening on the housing adjacent the treat cavity through which the one or more treats are loaded;
    an exit from the housing adjacent a second portion of the interior space through which the one or more treats are dispensed;
    barrier means for retarding the movement of the one or more treats when the housing is manipulated by a user, said barrier means being positioned in the second portion of the interior space between the treat cavity and the exit; and
    a sound producing means for selectively playing a pre-recorded sound, said sound producing means being removably secured to the opening and substantially closing the opening when secured therein, whereby when the sound producing means is secured to the housing the one or more treats can exit the toy only through the exit by navigating past the barrier means.

17. The toy of claim 16 wherein the barrier means comprise a first fin means positioned on a first plane and a second fin means positioned on a second plane, said first and second fin means for cooperating to retard the movement of the one or more treats as the housing is manipulated by the user.

18. The toy of claim 17 wherein the barrier means further comprise a third fin means having a first edge and a second edge, said first edge being proximate to the inner surface of the housing and said second edge being adjacent the first fin means, wherein the third fin means substantially bisects the first fin means, said third fin means for cooperating with the first and second fin means to retard the movement of the one or more treats as the housing is manipulated by the user.

19. The toy of claim 18 further comprising a fourth fin means proximate the inner surface of the housing, said fourth fin means for cooperating with the first, second, and third fin means for retarding the movement of the one or more treats as the housing is manipulated by the user.

20. The toy of claim 16 wherein the barrier means and the inner surface cooperate to form at least one trap between the treat cavity and the exit whereby the one or more treats cannot exit the housing when they are positioned in the at least one trap until the housing is further manipulated by the user.

21. The toy of claim 16 wherein the sound producing means comprises recording means for selectively recording a desired message.

22. The toy of claim 21 wherein the sound producing means further comprises sound activation means for producing an activation signal, the sound producing means playing the desired message in response to the activation signal.

23. The toy of claim 22 wherein the sound activation means comprises motion activated switch means.

24. The toy of claim 16 wherein the barrier means is positioned to prevent a movement of the treat along the inner surface between the treat cavity and the exit when the housing is manipulated by the user.

25. A toy comprising:
  a substantially spherical housing having an axis, an inner surface, an interior space, and an exterior surface;
  a treat cavity disposed within the interior space into which one or more treats are loaded;
  an opening in the housing adjacent the treat cavity through which the one or more treats are loaded into the treat cavity;
  an exit from the housing positioned about the axis, said exit permitting the one or more treats to exit the housing when the housing is manipulated by a user;
  a plurality of barriers positioned between the treat cavity and the exit, said plurality of barriers restricting movement of the one or more treats along the inner surface between the treat cavity and the exit when the housing is manipulated by the user; and
  a sound unit removably secured to the opening, said sound unit having a recording capability and a playback capability, and said sound unit further having a switch selectively activating the playback capability when the housing is manipulated by the user.

* * * * *